J. KELLY.
Cake-Turner.
No. 198,245.              Patented Dec. 18, 1877.
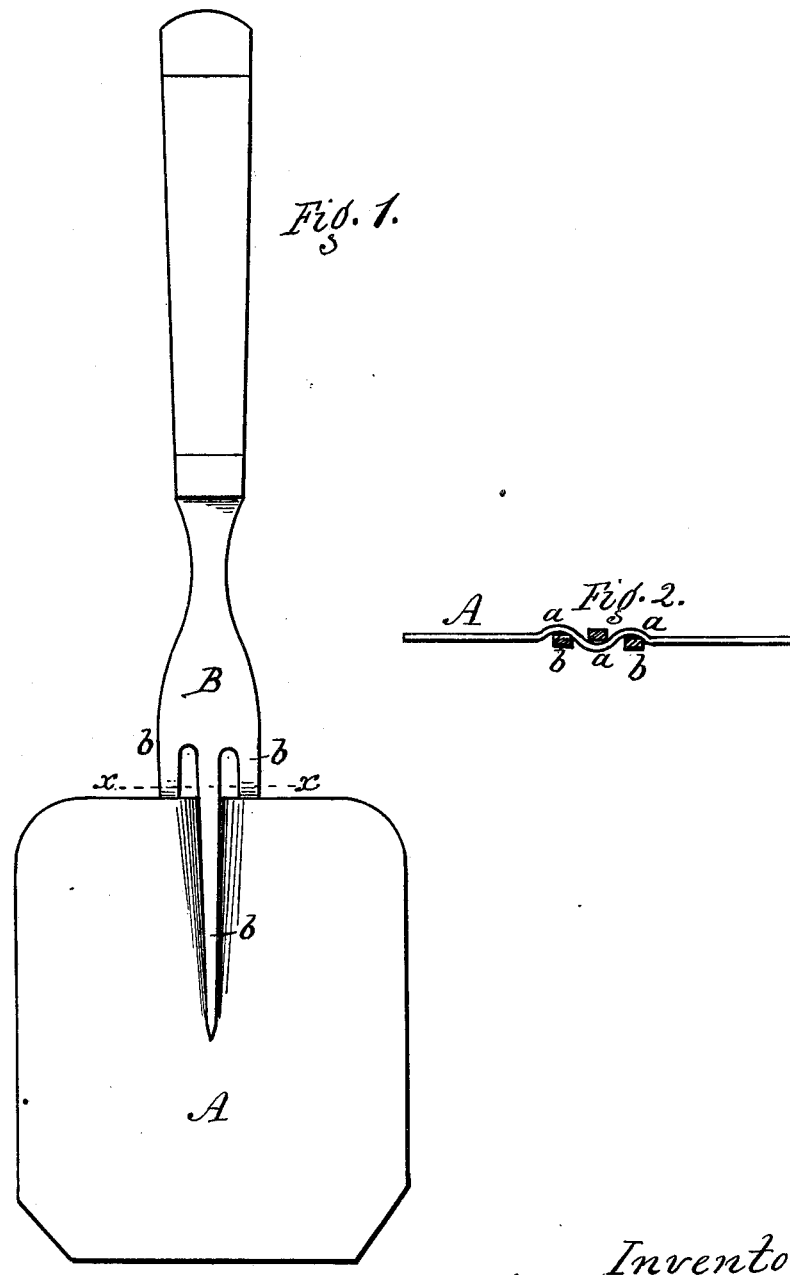
Attest.
Jacob Spahr
R. E. White
Inventor.
John Kelly,
per R. T. Osgood,
Atty.

UNITED STATES PATENT OFFICE.

JOHN KELLY, OF ROCHESTER, ASSIGNOR TO JOHN SNOW, OF OGDEN, N. Y.

IMPROVEMENT IN CAKE-TURNERS.

Specification forming part of Letters Patent No. 198,245, dated December 18, 1877; application filed November 30, 1877.

*To all whom it may concern:*

Be it known that I, JOHN KELLY, of the city of Rochester, in the county of Monroe and State of New York, have invented a certain new and useful Improvement in Pan-Cake Turners; and I do hereby declare that the following is a full, clear, and exact description of the same, reference being had to the accompanying drawings, in which—

Figure 1 is a plan of the device attached to a common fork, and Fig. 2 is a section in line $x\ x$ of Fig. 1.

My improvement relates to a device for turning pan-cakes in the act of cooking, and other similar uses where a flat plate is necessary.

The invention consists of a flat plate of metal, formed with corrugations so arranged as to be attached to a common table-fork, one tine of which passes over and two under the plate, resting in said corrugations, as hereinafter more fully described.

A represents the metallic plate, which may be of any desired size and form, but is preferably square or rectangular, with the corners clipped or rounded to prevent bending. This plate is provided with three corrugations, $a\ a\ a$, of sufficient length and depth to receive the three tines $b\ b\ b$ of the fork B, one of which tines slips over the top of the plate, and the other two under it, resting in said corrugations, as shown.

The corrugations serve to receive the tines without producing too much strain upon them by twisting, and they also serve to keep the plate in position against lateral displacement. When so attached the plate forms a fixture with the fork, without becoming a permanent attachment, and the fork serves as a handle, the parts being retained by frictional contact only. When not in use the plate can be removed from the fork.

The device thus formed is exceedingly cheap, as I avoid providing and riveting a handle to the plate, as is ordinarily done.

The device is applicable to many other uses than as a pan-cake turner.

What I claim as new is—

The plate A, constructed with the corrugations $a\ a\ a$, to receive the tines of an ordinary table-fork, as herein shown and described, and for the purpose specified.

In witness whereof I have hereunto signed my name in the presence of two subscribing witnesses.

JOHN KELLY.

Witnesses:
 R. F. OSGOOD,
 J. N. COLE.